R. PEDERSON.
LOADING FORK.
APPLICATION FILED JAN. 9, 1909.
935,544.
Patented Sept. 28, 1909.
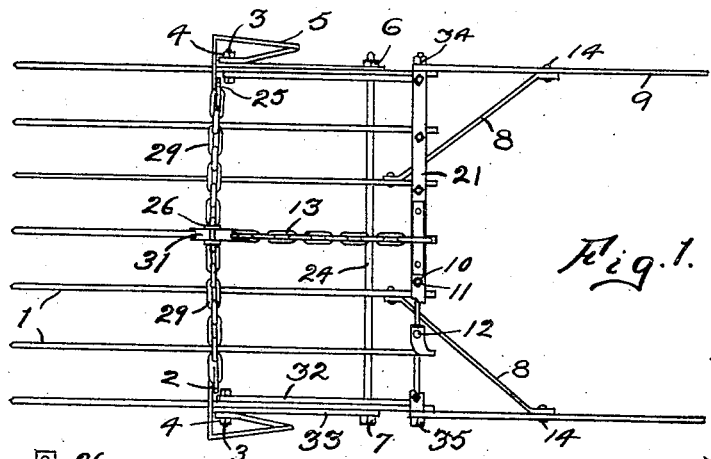
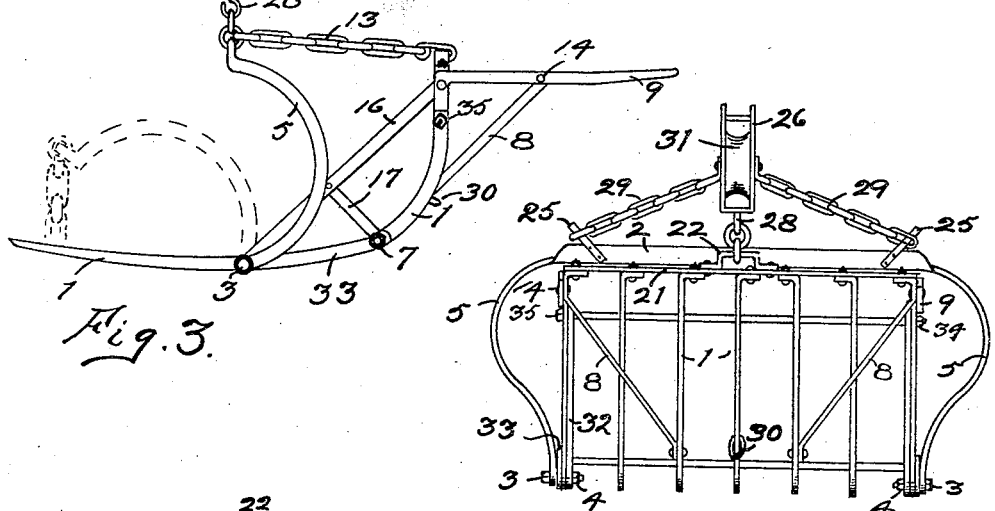
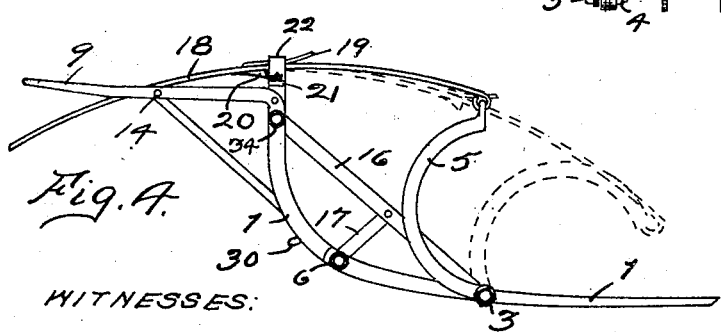
WITNESSES:
H. B. Burr
O. D. Young
INVENTOR
Rasmus Pederson.
BY G. C. Kennedy
ATTORNEY

UNITED STATES PATENT OFFICE.

RASMUS PEDERSON, OF PARKERSBURG, IOWA.

LOADING-FORK.

935,544.  Specification of Letters Patent.  Patented Sept. 28, 1909.

Original application filed June 20, 1908, Serial No. 439,571. Divided and this application filed January 9, 1909. Serial No. 471,394.

*To all whom it may concern:*

Be it known that I, RASMUS PEDERSON, a citizen of the United States of America, and a resident of Parkersburg, Butler county, Iowa, have invented certain new and useful Improvements in Loading-Forks, of which the following is a specification.

My invention relates to improvements in loading forks, of the type which are used in connection with wagon loading devices, and the object of my improvement is to so form and construct such a fork as will most conveniently and efficiently fulfil that purpose. This object I have accomplished by the means which are hereinafter fully described and claimed, and which are illustrated in the accompanying drawings, in which:

Figure 1 is an upper plan view of my improved loading fork, and of its detachable suspending connections. Fig. 2 is a rear elevation of the same. Fig. 3 is a left-hand side elevation of the same. Fig. 4 is a right-hand side elevation of a loading fork, containing an equivalent means of connection between the bail and rear part of fork.

Similar numbers refer to similar parts throughout the several views.

This application is a division of my application on wagon loading device, filed in the United States Patent Office, under Serial Number 439,571, June 20, 1908.

My improved fork is intended especially for use as a part of a wagon loading device, but of course it is useful for employment in other ways, such as in loading hay or other materials, or in connection with other auxiliary machinery, such as grading machinery or the like.

The fork consists of a plurality of spaced apart tines 1, curved upwardly at the rear, and having bent over ends with bolt-holes 12 to receive bolts 10 which secure them to a cross-bar 21, the bolts being fastened by nuts 11. A long bolt 7 is passed transversely through all the tines 1 and secured by a nut 6, spacing cylinders 24 being seated about the said bolt between the tines to keep them spaced apart. The outer tines 1 at the sides are reinforced by means of plates 32 and 33 on their inner and outer sides respectively, and being secured to said tines by means of bolts 3 secured by the nuts 4, and also by the bolt 7 and its nut 6. The lower ends of the bail 5 are pivoted on the bolts 3. Rearwardly-projecting handles 9 are secured to the upper rearward portions of the side tines 1 by a long bolt 35 and nut 34, said bolt extending through all the tines. Braces 8 are secured to said handles by rivets 14, and extend and are connected to two of the inner tines. Each side tine is supported by braces 16 and 17 extending across its curve, and secured thereto and to each other by the bolts 3 and 7 and other fastenings.

The fork is provided with a bail 5, which is formed in a manner to prevent its interfering with the delivery of the load therein as follows: The uprights of said bail are bent outwardly and then inwardly to form the horizontal middle portion 2. These uprights are curved with the concavity of the curve forwardly directed, and this method of spreading the uprights apart at the top and curving then to the rear, causes a better clearance of the load when dumping, since the rear part of fork swings upwardly in line with said uprights, while the spreading of the uprights at the top prevents overhanging parts of the load such as straw from clogging and catching thereon. The middle part of the bail top 2 is connected by a chain 13 to the middle of the top of the rear part of the fork to limit the distance of their separation when swung apart. The rear end of said chain has a hook which is detachably connected with an eyelet on the upper surface of the bar 21, such as is made by the bent bar 22. Instead of the chain 13, a slide-rod 18, as shown in Fig. 4, may be used, said rod slidable through the eyelet 22, and pivoted at its forward end to the cross-bar 2. A lug 20 is projected in a wedge-shape rearwardly from the middle of the under side of the rod 18, while on the upper side of said rod is a spring-plate 19 secured thereto at its rear end, its forward end adapted to spring away from the rod. When the rod 18 is moved through the eyelet 22, the spring collapses toward it to pass through the eyelet. Then the lug 20 engages the rear of the fork-frame, and the spring 19 expands away from the rod to engage said eyelet. The dotted lines in Fig. 4 indicate the forward position of the bail and rod 18 when the fork is taking on a load. When the bail is raised in lifting the fork, the lug 20 and spring 19 pass the eyelet and are locked in rear thereof, and remain so locked until the fork is dumped and returned, when the operator simply depresses the spring 19 by hand and returns the rod 18 to its first position to take on another load. The loop 30 at the back of the fork is to attach a rope to tilt the fork for dumping when it has been elevated and carried to its dumping location.

I have provided means for keeping the fork in equilibrium when one part of its load on one side of its middle line is heavier than the other. This consists of chains 29 which are connected to a block 26 containing a pulley 31 adapted to ride on any supporting means as an overhead rail or cable. The end links of these chains are looped detachably over outwardly sloped catches 25 on the bail 2 near its corners. The block 26 has a hook 28 which is detachably caught in a link connected to the middle of the bail. When the chains are slackened, they may be easily removed from the catches 25. These side-chains thus support the corners of the bail and steady the fork when under load.

My said improvements may be applied in practice to a scoop if desired to load such materials as grain, sand or other similar things, and thus may be used with a grading-machine or for other purposes of any analogous nature.

Having described my invention, what I claim as new, and desire to secure by Letters Patent, is:

1. A loading fork having a bail with depending members pivoted thereto intermediately at each side and linked thereto at the rear, the said members being concaved forwardly to provide clearance at the sides of the fork for projecting parts of its contents.

2. A loading fork having a bail with depending members pivoted thereto at each side and linked thereto at the rear, the said members being spaced farther apart at and near their upper ends than at their lower ends, and being concaved forwardly, to provide clearance at the sides of the fork for projecting parts of its load.

3. A loading fork having a bail with depending members pivoted thereto at each side, and having a rearwardly-projecting slide-bar pivoted thereto, a slide-way on said fork in which said slide-bar is adapted to slide, and a yieldable stop connected to said slide-bar adapted to pass therewith through said slide-way and spring out to engage the rear surface of the slide-way detachably to hold said fork in a desired traveling position.

4. A loading fork having a bail with depending members pivoted thereto and linked to the rear thereof, suspending means removably connected to the middle of said bail, and linking means removably connected between said suspending means and the said bail near its corners adapted to keep said fork in equilibrium when the load therein is distributed to be heavier on one side than on the other.

Signed at Waterloo, Iowa, this 21st day of Dec. 1908.

RASMUS PEDERSON.

Witnesses:
G. C. KENNEDY,
O. D. YOUNG.